United States Patent
Tessier et al.

(10) Patent No.: US 11,526,636 B2
(45) Date of Patent: Dec. 13, 2022

(54) MODELING AND TESTING OF HINGED FLIGHT CONTROL SURFACES OF AIRCRAFT

(71) Applicant: BOMBARDIER INC., Dorval (CA)

(72) Inventors: Claude Tessier, Sainte-Adele (CA); Gabriel Meunier, Saint-Bruno (CA)

(73) Assignees: BOMBARDIER INC., Dorval (CA); AIRBUS CANADA LIMITED PARTNERSHIP, Mirabel (CA)

( * ) Notice: Subject to any disclaimer, the term of this patent is extended or adjusted under 35 U.S.C. 154(b) by 719 days.

(21) Appl. No.: 16/471,879

(22) PCT Filed: Dec. 18, 2017

(86) PCT No.: PCT/IB2017/058062
§ 371 (c)(1),
(2) Date: Jun. 20, 2019

(87) PCT Pub. No.: WO2018/116129
PCT Pub. Date: Jun. 28, 2018

(65) Prior Publication Data
US 2020/0242283 A1    Jul. 30, 2020

Related U.S. Application Data

(60) Provisional application No. 62/437,156, filed on Dec. 21, 2016.

(51) Int. Cl.
*G06F 30/15* (2020.01)
*B64F 5/60* (2017.01)
(Continued)

(52) U.S. Cl.
CPC ............. *G06F 30/15* (2020.01); *B64F 5/60* (2017.01); *G06F 30/20* (2020.01); *B64C 13/00* (2013.01); *G06F 2113/28* (2020.01)

(58) Field of Classification Search
CPC ...... G06F 30/15; G06F 30/20; G06F 2113/28; B64F 5/60; B64C 13/00; B64C 9/02
See application file for complete search history.

(56) References Cited

U.S. PATENT DOCUMENTS 8,474,752 B2   7/2013   Kirkland
8,688,255 B2   4/2014   Ogawa et al.

OTHER PUBLICATIONS

Zaccai et al. Design Methodology for Trailing-Edge High-Lift Mechanism CEAS Aeronaut J, Aug. 4, 2016 (Year: 2016).*
(Continued)

*Primary Examiner* — Rehana Perveen
*Assistant Examiner* — Cuong V Luu
(74) *Attorney, Agent, or Firm* — Norton Rose Fulbright Canada LLP

(57) ABSTRACT

Methods and systems relating to the design and testing of systems that include hinged flight control surfaces of aircraft are disclosed. The systems and methods disclosed herein make use of a structural model representing a structural environment of the system in a relatively simple manner. In various embodiments, the structural model comprises one or more actuation branches having a common linear actuation direction, a load mass, and a massless connector representative of a hinge line of the flight control surface. The massless connector is connected to and disposed between the one or more actuation branches and the load mass and is movable along the common linear actuation direction so that linear movement of the massless connector is correlated to rotational movement of the hinged flight control surface.

23 Claims, 14 Drawing Sheets

(51) Int. Cl.
*G06F 30/20* (2020.01)
*G06F 113/28* (2020.01)
*B64C 13/00* (2006.01)

(56) References Cited

OTHER PUBLICATIONS

Haskew et al. Optimal Design of Electromechanical Actuators for Active Loads IEEE/ASME Transactions on Mechatronics, vol. 3, No. 2, Jun. 1998 (Year: 1998).*
Nam et al. Force Control System Desdign for Aerodynamic Load Simulator Proceeding of the American Control Conference, Jun. 2000 (Year: 2000).*
Cochoy et al. Concepts for Postiion and Load Control for Hybrid Actuation in Primary Flight Controls Aerospace Science and Technology 11, 2007 (Year: 2007).*
Arena et al. Modal Stability Assessment for a Morphing Aileron Subjected to Actuation System Failures 7th International on Mechanical and Aerospace Engineering, 2016 (Year: 2016).*
John W. Edwards, Analysis of Electrohydraulic Aircraft Control-Surface Servo and Comparison with Test Results, NASA Technical Note D-6928, Aug. 1972, pp. 1-72, United States of America.
Raghu Chaitanya, Model Based Aircraft Control System Design and Simulation, European Masters in Design and Technology of Advanced Vehicle Systems (EUROMIND)—Aeronautics, pp. 1-64, LIU-IEI-TEK-A-09/006300-SE, http://www.diva-portal.org/smash/get/diva2:224078/fulltext01, accessed on Nov. 4, 2016.
Matlab & Simulink, SimMechanics 2 User's Guide, The Math Works, Inc., 2007, pp. 4-29 to 4-33, United States of America.
Waheed Ur Rehman et al., Motion synchronization in a dual redundant HA/EHA system by using a hybrid integrated intelligent control design, Chinese Journal of Aeronautics, Dec. 22, 2015, pp. 789-798, vol. 29, No. 3, Elsevier, Amsterdam, Netherlands.
Haitao Qi et al., Investigation in hybrid actuation for duplex actuators operating in active/no load modes, International Conference on Advanced Intelligent Mechatronics, Jul. 14-17, 2009, pp. 993-997, IEEE/ASME, Piscataway, NJ, United States.
Dianliang Fan et al., An accurate, nonlinear model and control of hybrid actuation system (WIP), Jul. 6, 2014, pp. 1-8, China.
PCT international Search Report and Written Opinion dated Mar. 23, 2018 re: International Application No. PCT/IB2017/058062.
Olaf Cochoy et al., Concepts for position and load control for hybrid actuation in primary flight controls, ScienceDirect, Aerospace Science and Technology 11, Oct. 23, 2006, pp. 191-201, Elsevier, France.

* cited by examiner

MODELING AND TESTING OF HINGED FLIGHT CONTROL SURFACES OF AIRCRAFT

CROSS-REFERENCE TO RELATED APPLICATION(S)

This application is a national phase application under 35 U.S.C. 371 of International Patent Application No. PCT/IB2017/058062 filed on Dec. 18, 2017, which claims priority from U.S. Provisional Patent Application Ser. No. 62/437,156 filed on Dec. 21, 2016, the entire content of which is incorporated herein by reference.

TECHNICAL FIELD

The disclosure relates generally to flight control surfaces of aircraft, and more particularly to the design and testing of systems comprising flight control surfaces of aircraft.

BACKGROUND OF THE ART

The design and testing of actuation systems for flight control surfaces of aircraft can involve the development of virtual finite element models for modeling of aspects of such systems, and also the development of physical test rigs for testing components of such systems. Finite element structural models can contain a large number of nodes and associated parameters and accordingly can be relatively complex and time-consuming to produce and use. As the mesh is refined, the number of equations involved grows and hence the use of finite element methods for modeling of such systems can be computationally very intensive. The development and use of physical test rigs that are representative of the actual structure can also be time consuming and expensive. Improvement is desirable.

SUMMARY

In one aspect, the disclosure describes an apparatus for modeling a system including a hinged flight control surface of an aircraft. The apparatus comprises:
  one or more processors; and
  non-transitory machine-readable memory operatively coupled to the one or more processors, the machine-readable memory comprising:
    data representative of a structural model of the system including the hinged flight control surface, the structural model comprising:
      one or more actuation branches having a common linear actuation direction, each actuation branch comprising an actuator;
      a load mass; and
      a massless connector representing a hinge line of the flight control surface, the massless connector being connected to and disposed between the one or more actuation branches and the load mass, the massless connector being movable along the common linear actuation direction so that linear movement of the massless connector is correlated to rotational movement of the hinged flight control surface; and
    machine-readable instructions executable by the one or more processors and configured to cause the one or more processors to:
      using the data representative of the structural model of the system and data representative of an input to the system, generate data representative of a response of the system to the input.

The input may vary as a function of time.

The input may comprise a force representative of an aerodynamic load applied to the massless connector. The force may be oriented parallel to the linear actuation direction.

A magnitude of the force may be dependent upon a position of the massless connector along the linear actuation direction.

The input may comprise an actuation distance of the actuator.

The load mass may be resiliently connected to the massless connector.

The structural model may comprise a load damper disposed between the massless connector and the load mass.

The one or more actuation branches of the structural model may each comprise a backup structure stiffness, an actuator stiffness and a flight control surface stiffness.

The one or more actuation branches of the structural model may each comprise a branch spring.

The branch spring may define a backup structure stiffness and a flight control surface stiffness.

The branch spring may define an actuator stiffness.

The structural model may comprise a branch damper coupled in parallel with the branch spring.

In some embodiments of the apparatus, the one or more actuation branches may comprise a plurality of actuation branches, the massless connector may comprise a first rigid and massless bar extending across the plurality of actuation branches, and the plurality of actuation branches may be connected to a same side of the first rigid and massless bar.

The structural model may comprise a second rigid and massless bar extending across the plurality of actuation branches. The second rigid and massless bar may be connected in series with the plurality of actuation branches and be movable along the linear actuation direction.

The second rigid and massless bar may be disposed between the first rigid and massless bar and the load mass.

The second rigid and massless bar may be resiliently connected to the first rigid and massless bar and to the load mass.

The second rigid and massless bar may be disposed between the plurality of actuation branches and a grounding structure.

The second rigid and massless bar may be resiliently connected to the grounding structure.

Embodiments may include combinations of the above features.

In another aspect, the disclosure describes a computer-implemented method for modeling a system including a hinged flight control surface of an aircraft. The method comprises:
  receiving data representative of a structural model of the system including the hinged flight control surface, the structural model comprising:
    one or more actuation branches having a common linear actuation direction, each actuation branch comprising an actuator;
    a load mass; and
    a massless connector representative of a hinge line of the flight control surface, the massless connector being connected to and disposed between the one or more actuation branches and the load mass, the massless connector being movable along the common linear actuation direction so that linear movement of the massless connector is correlated to rotational movement of the hinged flight control surface;

receiving data representative of an input to the system; and using the data representative of the structural model of the system and the data representative of the input to the system, generating data representative of a response of the system to the input.

The input may vary as a function of time.

The input may comprise a force representative of an aerodynamic load applied to the massless connector. The force may be oriented parallel to the linear actuation direction.

A magnitude of the force may be dependent upon a position of the massless connector along the linear actuation direction.

The input may comprise an actuation distance of the actuator.

The load mass may be resiliently connected to the massless connector.

The structural model may comprise a load damper disposed between the massless connector and the load mass.

The one or more actuation branches of the structural model may each comprise a backup structure stiffness, an actuator stiffness and a flight control surface stiffness.

The one or more actuation branches of the structural model may each comprise a branch spring.

The branch spring may define a backup structure stiffness and a flight control surface stiffness.

The branch spring may define an actuator stiffness.

The structural model may comprise a branch damper coupled in parallel with the branch spring.

In some embodiments of the method, the one or more actuation branches may comprise a plurality of actuation branches, the massless connector may comprise a first rigid and massless bar extending across the plurality of actuation branches, and the plurality of actuation branches may be connected to a same side of the first rigid and massless bar.

The structural model may comprise a second rigid and massless bar extending across the plurality of actuation branches. The second rigid and massless bar may be connected in series with the plurality of actuation branches and be movable along the linear actuation direction.

The second rigid and massless bar may be disposed between the first rigid and massless bar and the load mass.

The second rigid and massless bar may be resiliently connected to the first rigid and massless bar and to the load mass.

The second rigid and massless bar may be disposed between the plurality of actuation branches and a grounding structure.

The second rigid and massless bar may be resiliently connected to the grounding structure.

Embodiments may include combinations of the above features.

In another aspect, the disclosure describes a method for fabricating a physical rig for testing a system including a hinged flight control surface of an aircraft. The method comprises:

receiving a medium containing a definition of a structural model of the system including the hinged flight control surface, the structural model comprising:

one or more actuation branches having a common linear actuation direction, each actuation branch comprising an actuator;

a load mass; and a massless connector representative of a hinge line of the flight control surface, the massless connector being connected to and disposed between the one or more actuation branches and the load mass, the massless connector being movable along the common linear actuation direction so that linear movement of the massless connector is correlated to rotational movement of the hinged flight control surface; and fabricating the physical rig substantially in accordance with the structural model.

The load mass of the structural model may be resiliently connected to the massless connector.

The structural model may comprise a load damper disposed between the massless connector and the load mass.

The one or more actuation branches of the structural model may each comprise a backup structure stiffness, an actuator stiffness and a flight control surface stiffness.

The one or more actuation branches of the structural model may each comprise a branch spring.

The branch spring may define a backup structure stiffness and a flight control surface stiffness.

The branch spring may define an actuator stiffness.

The structural model may comprise a branch damper coupled in parallel with the branch spring.

In some embodiments, the one or more actuation branches may comprise a plurality of actuation branches, the massless connector may comprise a first rigid and massless bar extending across the plurality of actuation branches, and the plurality of actuation branches may be connected to a same side of the first rigid and massless bar.

The structural model may comprise a second rigid and massless bar extending across the plurality of actuation branches. The second rigid and massless bar may be connected in series with the plurality of actuation branches and being movable along the linear actuation direction.

The second rigid and massless bar may be disposed between the first rigid and massless bar and the load mass.

The second rigid and massless bar may be resiliently connected to the first rigid and massless bar and to the load mass.

The second rigid and massless bar may be disposed between the plurality of actuation branches and a grounding structure.

The second rigid and massless bar may be resiliently connected to the grounding structure.

The method may comprise fabricating the physical rig using a physical component approximating the massless connector. The physical component may have a mass that is less than 10% of the load mass. The physical component may have a mass that is less than 5% of the load mass. The method may comprise compensating for the mass of the of the physical component by adjusting one or more parameters of the physical rig.

Embodiments may include combinations of the above features.

In another aspect, the disclosure describes a machine-readable medium useful for modeling or testing a system including a hinged flight control surface of an aircraft. The machine-readable medium may comprise:

machine-readable code representative of one or more actuation branches of the system, the one or more actuation branches having a common linear actuation direction and each actuation branch comprising an actuator;

machine-readable code representative of a load mass; and machine-readable code representative of a massless connector representative of a hinge line of the flight control surface, the massless connector being connected to and disposed between the one or more actuation branches and the load mass, the massless connector being movable along the common linear actuation direction so that linear movement of the massless connector is correlated to rotational movement of the hinged flight control surface.

The machine-readable medium may comprise machine-readable code representative of the load mass being resiliently connected to the massless connector.

The machine-readable medium may comprise machine-readable code representative of a load damper being disposed between the massless connector and the load mass.

The machine-readable medium may comprise machine-readable code representative of the one or more actuation branches each comprising a backup structure stiffness, an actuator stiffness and a flight control surface stiffness.

The machine-readable medium may comprise machine-readable code representative of the one or more actuation branches each comprising a branch spring.

The machine-readable medium may comprise machine-readable code representative of the branch spring defining a backup structure stiffness and a flight control surface stiffness.

The machine-readable medium may comprising machine-readable code representative of the branch spring defining an actuator stiffness.

The machine-readable medium may comprise machine-readable code representative of a branch damper coupled in parallel with the branch spring.

The machine-readable medium may comprise machine-readable code representative of: the one or more actuation branches comprising a plurality of actuation branches; the massless connector comprising a first rigid and massless bar extending across the plurality of actuation branches; and the plurality of actuation branches being connected to a same side of the first rigid and massless bar.

The machine-readable medium may comprise machine-readable code representative a second rigid and massless bar extending across the plurality of actuation branches, the second rigid and massless bar being connected in series with the plurality of actuation branches and being movable along the linear actuation direction.

The machine-readable medium may comprise machine-readable code representative of the second rigid and massless bar being disposed between the first rigid and massless bar and the load mass.

The machine-readable medium may comprise machine-readable code representative of the second rigid and massless bar being resiliently connected to the first rigid and massless bar and to the load mass.

The machine-readable medium may comprise machine-readable code representative of the second rigid and massless bar being disposed between the plurality of actuation branches and a grounding structure.

The machine-readable medium may comprise machine-readable code representative of the second rigid and massless bar being resiliently connected to the grounding structure.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure relates to the design and testing of systems that include hinged flight control surfaces of aircraft. The apparatus and methods disclosed herein make use of a structural model representing a structural environment of the system in a relatively simple manner while providing sufficient accuracy for some uses such as modeling and testing. For example, in some embodiments, the structural model disclosed herein may be suitable for modeling static and dynamic behavior of the system to facilitate tasks such as system identification, servo loop design, performance and stability assessments. In some embodiments, the simplicity and accuracy of the structural model disclosed herein may facilitate analytical studies and numerical simulations of a system. In addition, the structural model disclosed herein may, in some embodiments, serve as a specification for fabricating a suitable physical test rig for testing the system or components thereof. The use of the structural model disclosed herein for the modeling and testing of such systems may be more efficient and economical than other known methods and may be advantageous in the design and development of systems that include hinged flight control surfaces of aircraft.

Aspects of various embodiments are described through reference to the drawings.

Figure 1:
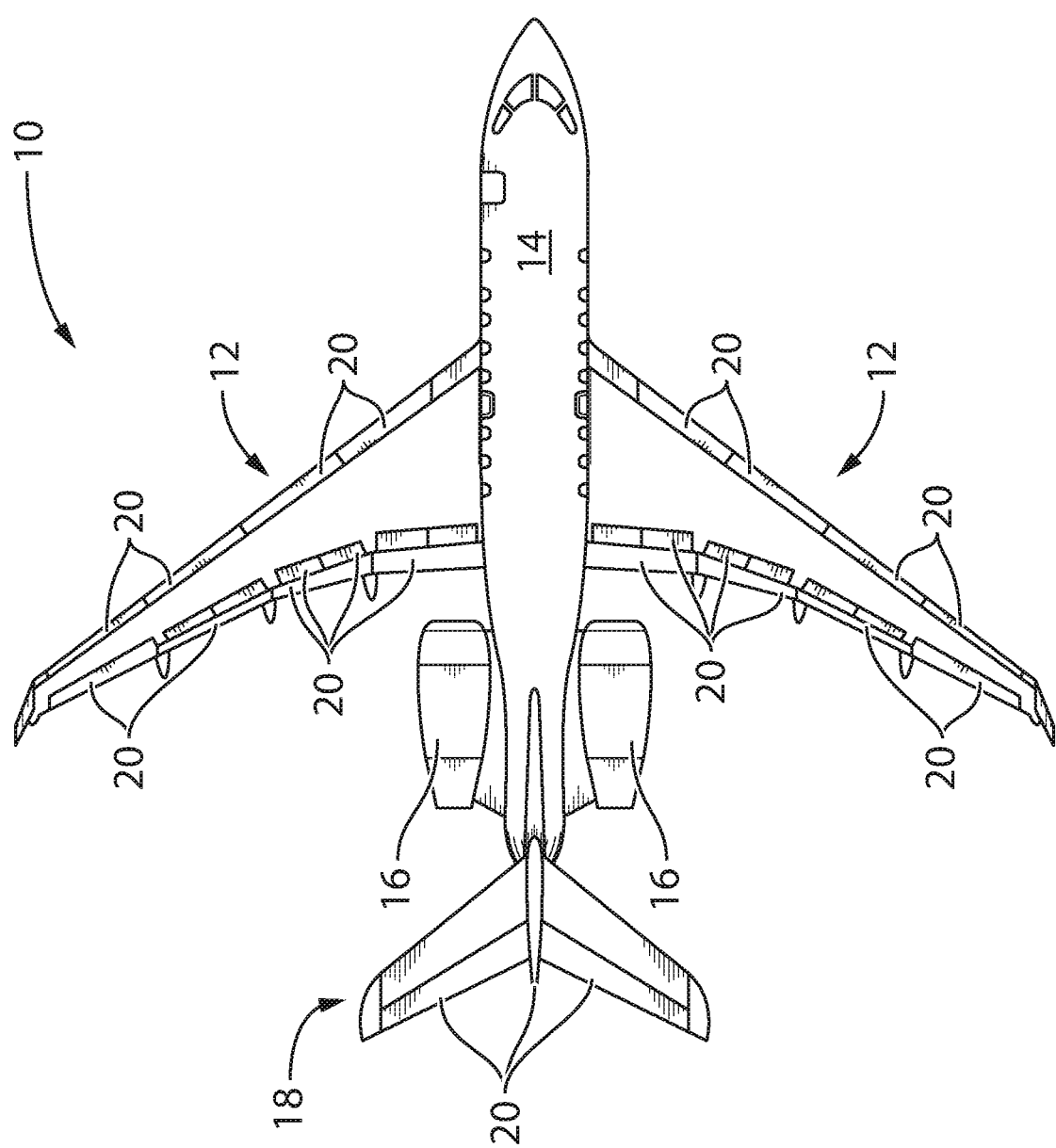
FIG. 1 is a top plan view of an exemplary aircraft comprising flight control surfaces.

FIG. 1 is a top plan view of an exemplary aircraft 10 comprising a system comprising a flight control surface 20 as disclosed herein. In various embodiments, aircraft 10 may be any type of aircraft such as corporate (e.g., business jet), private, commercial and passenger aircraft. For example, aircraft 10 may be a narrow-body, twin-engine jet airliner. Aircraft 10 may be a fixed-wing aircraft. Aircraft 10 may comprise one or more wings 12, fuselage 14, one or more engines 16 and empennage 18 of suitable type. Aircraft 10 may comprise movable flight control surfaces 20 that allow the adjustment and control of the attitude of aircraft 10. In various embodiments, flight control surfaces 20 may include high-lift surfaces such as leading slats and trailing edge flaps, and other flight control surfaces 20 such as spoilers, airbrakes, ailerons, elevators, horizontal stabilizers and rudders, for example. Some flight control surfaces 20 may be hinged (i.e., pivotable about a hinge line) to a backup or grounding structure of aircraft 10 so as to be deployed or retracted by way of rotation. Accordingly, aircraft 10 may comprise one or more systems that include a hinged flight control surface 20 and that may be modeled and tested using the structural model described herein. Even though flight control surfaces 20 of aircraft 10 are labeled using the same reference numeral, it is understood that some of flight control surfaces 20 of aircraft 10 may not necessarily be hinged and may undergo a different type of movement during deployment/retraction.

Figure 2:
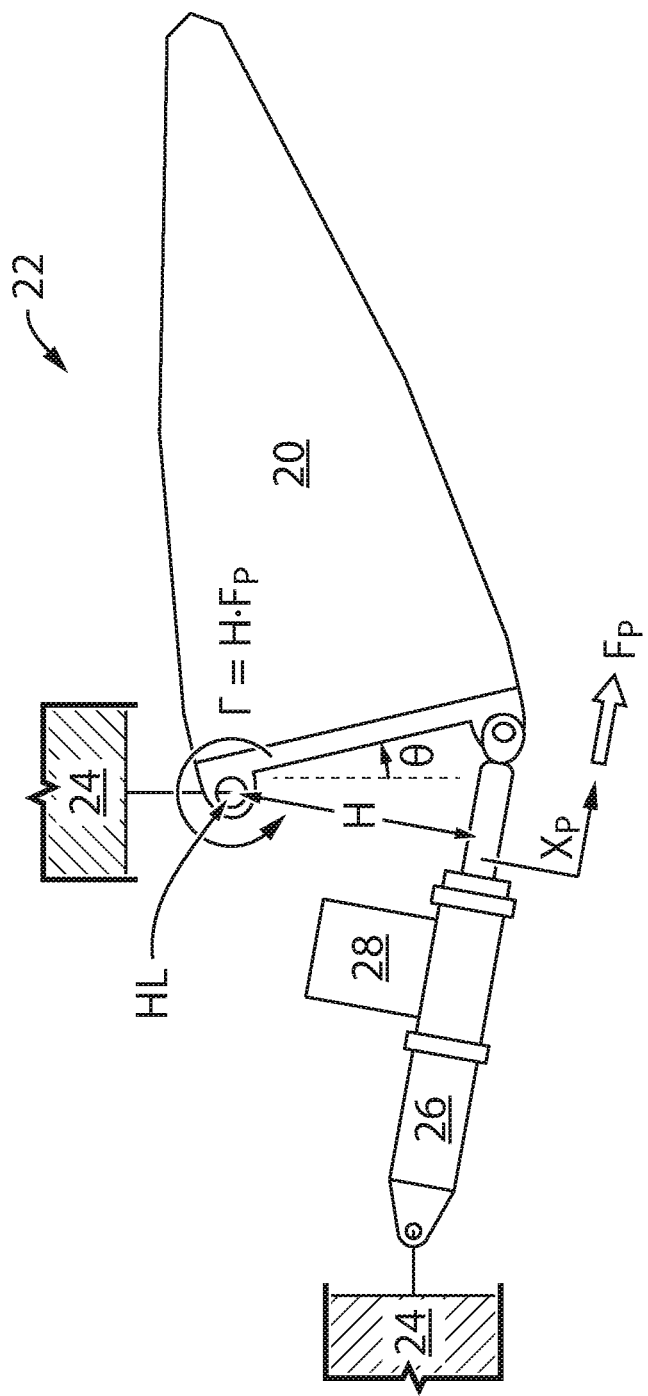
FIG. 2 is a schematic side representation of an exemplary system including a hinged flight control surface of the aircraft of FIG. 1.

FIG. 2 is a schematic representation of a side view of an exemplary hinged flight control surface 20 of aircraft 10. Hinged flight control surface 20 may be part of system 22, which may include an actuation system of flight control surface 20. Flight control surface 20 may be pivotally coupled to a relatively rigid backup structure 24 and may be configured for rotation about hinge line HL. Depending on the type of flight control surface 20, backup structure 24 may comprise a structure of wing 12, a structure of fuselage 14 or a structure of empennage 18, for example. Depending on the type of flight control surface 20, system 22 may comprise one or more actuators 26 that are configured to cooperatively actuate flight control surface 20 about hinge line HL. In some embodiments, each actuator 26 coupled to the same flight control surface 20 may be of the same (e.g., electric or hydraulic) type. In the case of a hydraulic actuator 26, a suitable electrohydraulic servo valve 28 (EHSV) may be used to control the actuation of actuator 26. In the exemplary configuration shown in FIG. 2, actuator 26 is a linear actuator configured to cause movement $X_P$ and apply force $F_P$ to flight control surface 20 along a direction that is perpendicular to hinge line HL and at a point on flight control surface 20 that is located at a distance (offset) from hinge line HL to cause rotation of flight control surface 20 by the amount θ. The corresponding moment or torque Γ applied to flight control surface 20 about hinge line HL by actuator(s) 26 in this arrangement may be represented by Γ=H·$F_P$, where H is an effective moment arm at which the force $F_P$ is applied in relation to hinge line HL. It is understood that aspects of the present disclosure are not limited to linear actuators 26 but may also apply to systems comprising one or more rotary or other types of actuators 26, and, to systems comprising a combination of different types of actuators 26 directly or indirectly coupled to the same flight control surface 20.

System 22 may be configured differently than the exemplary configuration of FIG. 2 depending on factors such as, for example, the type of flight control surface 20 and installation constraints. For example, actuator 26 may be integrated into a mechanism of any suitable kinematic arrangement for the purpose of actuating flight control surface 20 about hinge line HL. In some embodiments, actuator 26 may be integrated in a flange-mounted type of installation suitable for some types of flight control surfaces 20.

In some embodiment, system 22 may comprise a single actuator 26 defining a single actuation branch. Alternatively, system 22 may comprise two, three or more actuators 26 coupled to flight control surface 20 to define a plurality of parallel actuation branches. For a primary flight control surface 20 such as an aileron, elevator or rudder for example, an associated system 22 may comprise two or three actuators 26 acting in parallel. However, for some other types of flight control surfaces 20 such as a multi-function spoiler, a ground spoiler or a horizontal stabilizer for example, an associated system 22 may comprise a single actuator 26.

Figure 3:
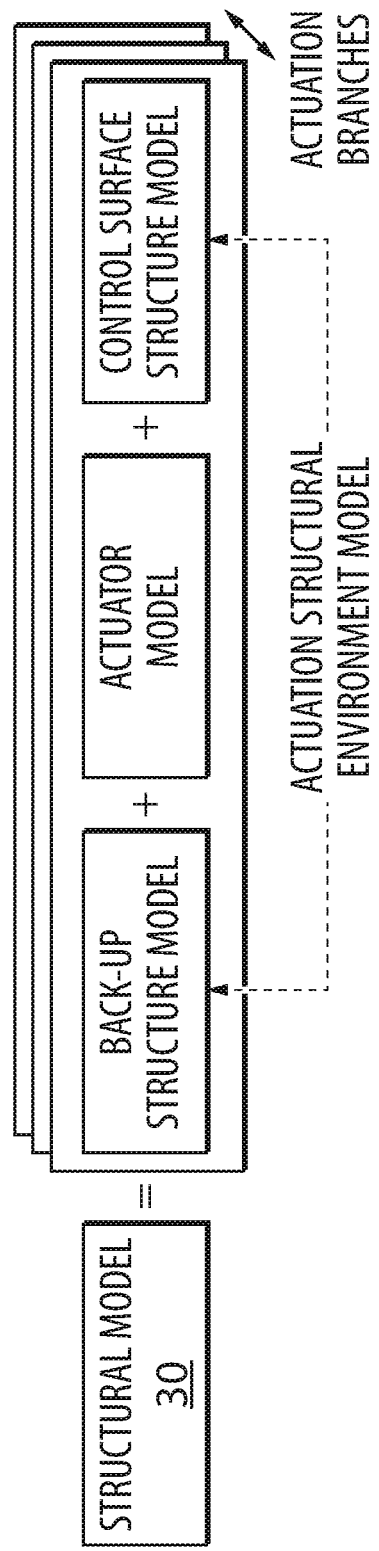
FIG. 3 is an exemplary schematic representation of main elements of a structural model of a system comprising the hinged flight control surface of FIG. 2.

FIG. 3 is an exemplary schematic representation of main elements of structural model 30 of system 22 comprising hinged flight control surface 20 of FIG. 2. As explained in greater detail below, structural model 30 may provide a representation of the static and dynamic characteristics of the structural environment of system 22 that is relatively simple but yet that is sufficiently sophisticated to allow for meaningful modeling of static and/or dynamic behavior of system 22. In addition, model 30 may also be used as a structural specification for the design and fabrication of a suitable physical test rig that sufficiently represents the actual structural environment of system 22 for testing system 22 or components thereof. In various embodiments, structural model 30 of system 22 may define characteristics of back-up structure 24, characteristics of actuator 26 and characteristics of flight control surface 20 for each actuation branch of system 22.

Figure 4:
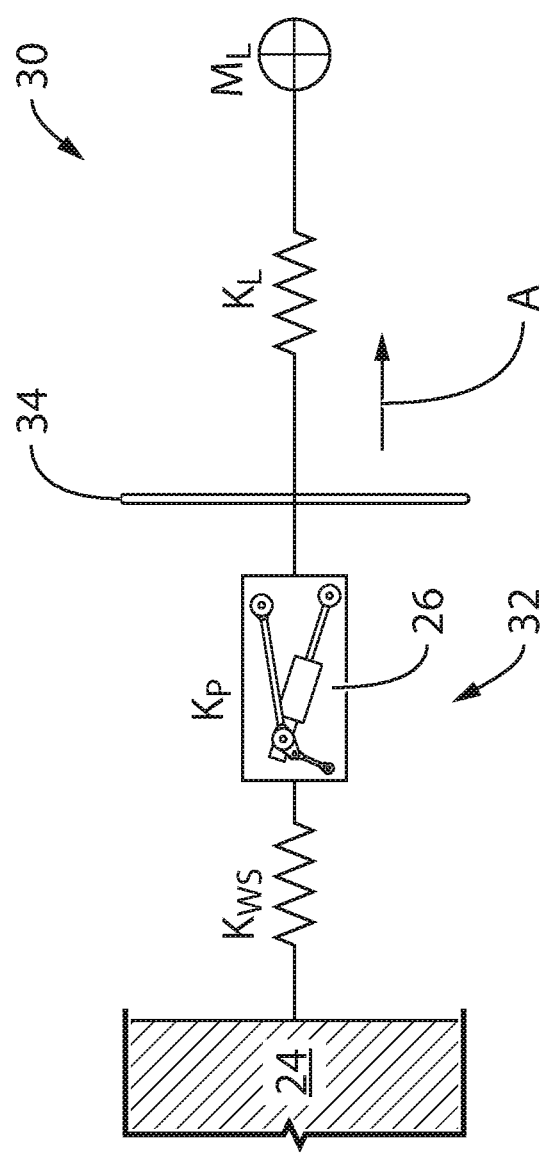
FIG. 4 is a graphical representation of an exemplary embodiment of the structural model for the system of FIG. 2 comprising a single actuation branch.

FIG. 4 is a graphical representation of an exemplary embodiment of structural model 30 for system 22 of FIG. 2 comprising a single actuator 26. System 22 as represented by structural model 30 of FIG. 4 may comprise a spoiler of aircraft 10 for example. Structural model 30 may comprise a single actuation branch 32 comprising a branch spring of stiffness value $K_{WS}$ representing a structural environment stiffness and actuator 26 (e.g., power control unit or "PCU") of stiffness value $K_P$. $K_{WS}$ may be a combination of a stiffness value (i.e., $K_W$) of backup structure 24 (e.g., wing 12) and of a stiffness value (i.e., $K_S$) flight control surface 20 disposed in series such that $1/K_{WS}=1/K_W+1/K_S$. The stiffness value $K_S$ may be associated with the attachment of actuator 26 to flight control surface 20 and with a stiffness of flight control surface 20. The stiffness value $K_W$ may be associated with backup structure 24 (e.g., wing 12, horizontal or vertical stabilizer of empennage 18) and hinge fittings. In various embodiments, stiffness values such as $K_S$, $K_W$, $K_P$ may be provided in different orders along an associated actuation branch 32. Actuation branch 32 may have a linear actuation direction along arrow A.

Structural model 30 may comprise load mass $M_L$ and massless connector 34 representative of hinge line HL of hinged flight control surface 20. In some embodiments, massless connector 34 may be a first rigid and massless bar. Massless connector 34 may be connected to and disposed between actuation branch 32 and load mass $M_L$. Within structural model 30, massless connector 34 may be permitted to move exclusively along the linear actuation direction A so that linear movement of the massless connector 34 may be correlated to rotational movement of the hinged flight control surface 20 about hinge line HL. Actuation branch 32 may be connected to a first (e.g., left) side of massless connector 34 and load mass $M_L$ may be connected to an opposite second (e.g., right) side of massless connector 34.

Structural model 30 may be configured to represent a rotational system (e.g., hinged flight control surface 20) into an equivalent translational system. Alternatively, structural model 30 may be configured to represent systems in rotary or hybrid (e.g., rotary and linear) representations. For the purpose of using structural model 30, it may be possible to convert a rotational system into an equivalent translational system and vice versa. For example, structural model 30 may be used to represent linear, rotary or hybrid systems which may require partial conversion to equivalent translation representation. The conversion between translation and rotation may be established using a scaling factor associated with lever arm H (shown in FIG. 2). For example, if θ is an angular position of flight control surface 20 and $X_P$ is the linear displacement of actuator 26 from a reference (e.g., null or faired) position, then the forward kinematics relating $X_P$ to θ can be expressed as $\theta(X_P)$ and the relationship with lever arm H can be expressed as:

$$\frac{d\theta}{dX_P} = \frac{1}{H(X_P)}$$

One could also write $H(X_P)=H(X_P(\theta))=H(\theta)$. For a relatively small angular displacement θ, $\Delta\theta=\Delta X_P/H(\theta)$.

In cases where structural model 30 may be configured to provide a rotary representation requiring conversion of some linear elements, some linear stiffness elements could be converted into corresponding torsional stiffness elements. The relationship between linear stiffness K and torsional stiffness $K_\theta$ may be $K=K_\theta/H^2$ where H is the lever arm.

Structural model 30 may provide an equivalent linear representation of a rotary system where various parameters such as stiffness terms represented by springs are valued relative to the line of action of actuator 26. Similarly, the position of flight control surface 20 (and its derivatives) and inertia can be represented by the equivalent actuator translation and equivalent mass connected to actuator 26 and moving parallel to the line of action of actuator 26. In the context of FIG. 4, structural model 30 includes a single actuator branch 32 but it is understood that additional actuation branches 32 may be added to structural model 30 to represent a system 22 comprising multiple actuators 26.

Load mass $M_L$ may be resiliently connected to massless connector 34 via a load spring of stiffness value $K_L$. Load mass $M_L$ may be associated with a mode of system 22 and may depend on the overall distribution of mass, stiffness and mode shape. In some embodiments, load mass $M_L$ may, for example, be associated with a first (i.e., lowest) rotation mode of flight control surface 20 of system 22. In some embodiments, load mass $M_L$ may be suitably approximated by an equivalent mass derived from the moment of inertia J of flight control surface 20 about hinge line HL. Accordingly, actuator 26 may feel a corresponding equivalent (translation) load mass $M_L$ given by $M_L=J/H^2$ in reference to the configuration of flight control surface 20 of FIG. 2. The effective lever arm H is squared due the combined conversion from angular position to linear position, and from angular moment to linear force.

Some inaccuracies associated with approximating load mass $M_L$ using the equivalent mass of flight control surface 20 may be partially compensated by adjusting the stiffness value $K_L$. The stiffness value $K_L$ of the load spring may also serve to absorb the influence of the mass of actuator 26 on the mode frequency. However, in some embodiments, a suitable scaling factor may be applied to load mass $M_L$ to account for the mass of actuator 26. The mode frequency f of a single mass-spring system of mass M and dynamic stiffness $K_D$ can be represented by the following expression:

$$f(hz) = \frac{1}{2\pi} \times \sqrt{\frac{K_D}{M}}.$$

Structural model 30 may be used as a specification to produce a physical test rig or to support analytical design and performance studies as well as be integrated in either substantially high-fidelity or real-time simplified (e.g., early-stage) simulation models to support various tasks such as, for example: (1) the development of position servo loop including performance and stability assessments in different nominal and failed situations; (2) the development of a force fight reduction controller for system 22 including multiple actuation branches 32, including performance and stability assessments in different nominal and failed situations; (3) the derivation of endurance and fatigue spectra to support component and structural design; (4) the determination of control surface performance such as position accuracy under load and assessment of transients under failures including oscillatory failures; (5) the maneuvering and load estimations in nominal and failure conditions; (6) the development of actuation-related monitors and reconfiguration logic to accommodate failure situations; and (7) the development of flight control laws.

In comparison with a finite element model (FEM) that supports the preliminary and detailed design and assessment of complex aircraft structures and that can include several thousands of parameters, structural model 30 is a massively reduced-order model comprising significantly fewer (e.g., a handful of) parameters. Moreover, structural model 30 may, in some embodiments, support simple and independent system identification and parameter estimation for its different parts and capture both the static and dynamic behavior of system 22. Structural model 30 may define a relatively simplified organization or topology of the structural arrangement of system 22.

Figure 5:
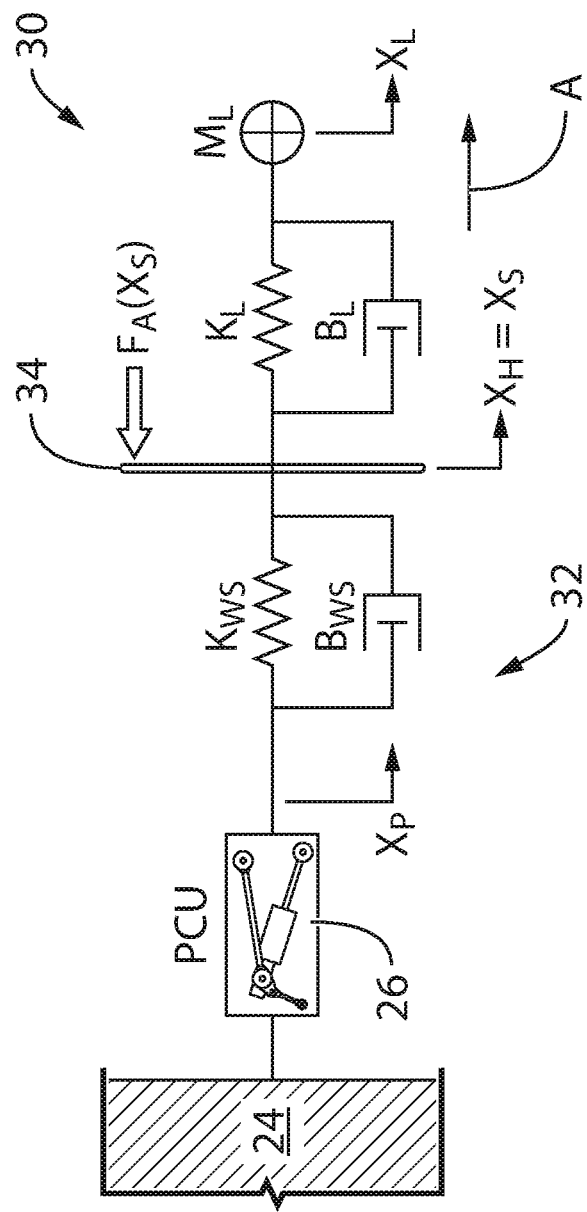
FIG. 5 is a graphical representation of another exemplary embodiment of the structural model for the system of FIG. 2 comprising the single actuation branch.

FIG. 5 is a graphical representation of another exemplary embodiment of structural model 30 for the system 22 of FIG. 2 comprising single actuation branch 32. The embodiment of FIG. 5 comprises elements previously described above in relation to FIG. 4 and like elements are identified using like reference numerals. Structural model 30 may comprise damping terms to introduce friction or other damping in structural model 30. For example, structural model 30 may include branch damper $B_{WS}$ coupled in parallel with branch spring $K_{WS}$. Structural model 30 may further include load damper $B_L$ coupled in parallel with load spring $K_L$ so as to be disposed between massless connector 34 and load mass $M_L$. In some embodiments, structural model 30 may include a damping term applied directly to load mass $M_L$. In some embodiments, structural model 30 may include a damping term applied directly to massless connector 34.

FIG. 5 shows actuation displacement $X_P$ of actuator 26, displacement $X_H$ of massless connector 34 and displacement $X_L$ of load mass $M_L$. Linear displacements $X_P$, $X_H$ and $X_L$ may all be oriented parallel to actuation direction A. As explained above, linear displacement $X_H$ (e.g., linear oscillation) of massless connector 34 may be correlated to the angular displacement (e.g., rotary oscillation) of flight control surface 20.

FIG. 5 also shows a force $F_A(X_S)$ being applied to massless connector 34 as an input to system 22 as represented by structural model 30. Such input may be used during modeling of system 22 using structural model 30. Force $F_A(X_S)$ may be representative of an aerodynamic force acting on flight control surface 20 during flight for example. Accordingly, force $F_A(X_S)$ may vary based on the position $X_S$ of flight control surface 20. For the purpose of modeling, suitable input(s) to system 22 may be applied to massless connector 34 and/or to load mass $M_L$ of structural model 30. Other inputs to system 22 may comprise changes in actuation position of actuator 26, of position of massless connector 34 and/or of position of load mass $M_L$. In some embodiments, the input to system 22 may vary as a function of time.

A detailed simulation model for actuator 26 may be integrated into structural model 30 and take into consideration the compressibility of the hydraulic fluid and other parameters so that the actual stiffness $K_P$ of actuator 26 would be implicitly and automatically included in structural model 30 without the need for adding the corresponding stiffness element $K_P$. The stiffness of actuator 26 may change as a function of its stroke and of its dynamics.

Alternatively, a simplified simulation model for actuator 26 integrated into structural model 30 may consider the hydraulic fluid to be incompressible and other parameters resulting in the stiffness $K_P$ of actuator 26 to be missing from the actuator simulation model. In this situation, the stiffness $K_P$ could be explicitly introduced on each actuation branch 32 by adding its value in series with the structural environment stiffness $K_{WS}$. The resulting branch stiffness $K_{WPS}$ for actuation branch 32 could then be computed according to $1/K_{WPS}=1/K_P+1/K_{WS}$.

Figure 6:
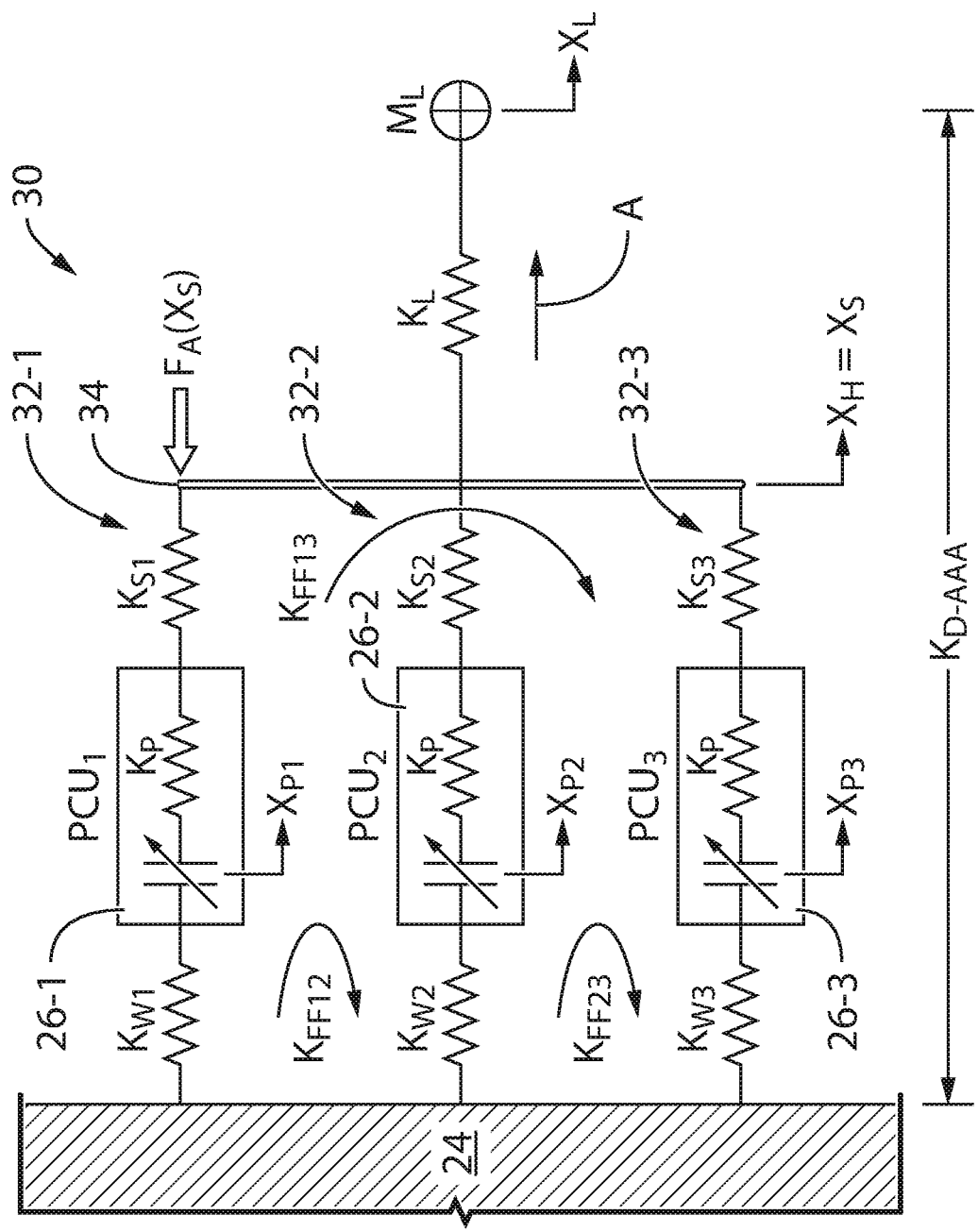
FIG. 6 is a graphical representation of another exemplary embodiment of the structural model for the system of FIG. 2 comprising three actuation branches.

FIG. 6 is a graphical representation of another exemplary embodiment of structural model 30 for system 22 of FIG. 2 comprising a plurality of (e.g., three) independent actuation branches 32-1 to 32-3. The embodiment of FIG. 6 comprises elements previously described above and like elements are identified using like reference numerals. System 22 as represented by structural model 30 of FIG. 6 may comprise a rudder of aircraft 10 for example. In some embodiments, the plurality of actuation branches 32-1 to 32-3 may be functionally equivalent and may comprise parameters substantially identical in nature. Alternatively, the actuation branches 32-1 to 32-3 may not be functionally equivalent and may comprise different parameters. In any case, actuation branches 32-1 to 32-3 may be parallel to each other and may each have an actuation direction that is parallel to actuation direction A. Massless connector 34 may comprising a rigid and massless bar extending across the plurality of actuation branches 32-1 to 32-3 where actuation branches 32-1 to 32-3 are all connected to a same (e.g., left) side of massless connector 34. Massless connector 34 may be permitted to move exclusively along actuation direction A. FIG. 6 also shows the stroke or linear displacement $X_{P1}$ to $X_{P3}$ of actuators 26-1 to 26-3 as being parallel to actuation direction A.

FIG. 6 also shows three force fight loops $K_{FF12}$, $K_{FF13}$ and $K_{FF23}$, which may be used to develop of a force fight reduction controller for system 22. One consideration for system 22 comprising multiple actuators 26, is the ability to ensure that actuators 26 are positioned at relatively the same position to avoid relatively large forces that may otherwise occur due to actuator mis-positioning, which may lead to force fight and fatigue considerations. Structural model 30 of FIG. 6 includes three force fight loops: force fight loop $K_{FF12}$ between actuation branches 32-1 and 32-2; force fight loop $K_{FF13}$ between actuation branches 32-1 and 32-3; and force fight loop $K_{FF23}$ between actuation branches 32-2 and 32-3. For example, force fight loop $K_{FF12}$ involving actuation branches 32-1 and 32-2 is such that a differential displacement $X_{P1}$-$X_{P2}$ between actuators 26-1 and 26-2 will result in equal but opposite actuator loads F1=F2=F. The force fight loop stiffness $K_{FF12}$ may be represented as $$\left| \frac{F}{X_{P1} - X_{P2}} \right|.$$

Each actuation branch 32 of structural model 30 may comprise a backup structure stiffness value $K_W$, an actuator stiffness value $K_P$, and a stiffness value $K_S$ of flight control surface 20 disposed in series as explained above. The stiffness values provided in structural model 30 may be suitable to capture all force fight situations involving any two branches, but also involving the three branches simultaneously. The $K_W$ and $K_S$ values may be independent of the actuator stiffness $K_P$ so that the stiffness of the environment may be independent of the actuators 26. In some embodiments, actuation branches 32 (i.e., left hand side of massless connector 34) may not include any dynamic parameters other than that which may be attributed to actuators 26 and may therefore be referenced as the static part of structural model 26. The parameters of actuation branches 32 may serve to capture the force fight behavior of system 22 and the compliance under load (i.e., how the position of flight control surface 20 is affected by an applied aerodynamic load $F_A(X_S)$).

One or more inputs such as an aerodynamic load $F_A(X_S)$ on flight control surface 20 may be applied to system 22 at massless connector 34 parallel to actuation direction A for the purpose of modeling (i.e., conducting virtual experiments on) system 22. This linear load may be converted from the angular hinge moment as described above. The aerodynamic load $F_A(X_S)$ could also be applied at load mass $M_L$ in some embodiments. In some embodiments, aerodynamic load $F_A(X_S)$ used for modeling may be time-dependent. The elements on the right hand side of structural model 30 in combination with the elements of actuation branches 32 may capture the first rotation mode frequency of system 22. This may be achieved by connecting load mass $M_L$ to massless connector 34 via the load spring of stiffness $K_L$. A stiffness value of $K_L$ may be used such that together with the stiffness terms (e.g., $K_W$, $K_P$, $K_S$) of actuation branches 32, the system mode frequencies for all configurations of system 22 may be adequately reflected by structural model 30.

The mode frequency $f_{CFG}$ for any given configuration CFG can be obtained by determining the corresponding dynamic stiffness $K_{D-CFG}$. Different configurations CFG of system 22 may correspond to different numbers of actuation branches 32 being active so as to provide their full stiffness, being disconnected (effectively absent), or, in a damped mode so as to provide a damping force instead of a stiffness. For example, system 22 may have an Active-Active-Active (AAA) configuration, an Active-Disconnect-Active (AXA) configuration and so on. The dynamic stiffness $K_{D-CFG}$ may be the composition in series of the combined actuation branch stiffness $K_{WPS}$ taken in parallel to yield (i.e., static) stiffness value $K_{STATIC}$ with the load stiffness $K_L$ taken in series. Accordingly, $$f_{CFG} = \frac{1}{2\pi}\sqrt{\frac{K_{D-CFG}}{M_L}} \text{ and}$$

$$\frac{1}{K_{D-CFG}} = \frac{1}{K_{STATIC-CFG}} + \frac{1}{K_L}$$

where $K_{STATIC-CFG} = \Sigma K_{WPS}$ over all of the connected branches 32 of the specific configuration CFG and $1/K_{WPS} = 1/K_W + 1/K_P + 1/K_S$.

For example, for a three-actuator flight control surface 20, the mode frequencies $f_{AAA}$ for the AAA configuration may be represented by $$f_{AAA} = \frac{1}{2\pi}\sqrt{\frac{K_{D-AAA}}{M_L}} \text{ where}$$

$$\frac{1}{K_{D-AAA}} = \frac{1}{K_{STATIC-AAA}} + \frac{1}{K_L} \text{ and}$$

$$K_{STATIC-AAA} = K_{WPS1} + K_{WPS2} + K_{WPS3}.$$

For a three-actuator flight control surface 20, the mode frequencies $f_{AXA}$ for the AXA configuration may be represented by $$f_{AXA} = \frac{1}{2\pi}\sqrt{\frac{K_{D-AXA}}{M_L}} \text{ where}$$

$$\frac{1}{K_{D-AXA}} = \frac{1}{K_{STATIC-AXA}} + \frac{1}{K_L} \text{ and}$$

$$K_{STATIC-AXA} = K_{WPS1} + K_{WPS3}.$$

In light of this disclosure, one skilled in the relevant arts will understand how to determine the relationships for other configurations of a system 22 including multiple actuation branches 32. For example, a two-actuator system 22 may include the following active A/disconnect X configurations: AA, AX and XA. For example, a three-actuator system 22 may include the following active A/disconnect X configurations: AAA, AAX, AXA, XAA, AXX, XAX and XXA. Configurations including one or more actuation branches 32 being in a damping mode are described further below.

Given that the actuator stiffness $K_P$ and the inertia of flight control surface 20 may be known or provided, the structural environment for a three-actuator flight control surface 20 may therefore comprise four parameters (e.g., $K_{WS1}$, $K_{WS2}$, $K_{WS3}$ and $K_L$). Similarly, the structural environment for a two-actuator flight control surface 20 may comprise three parameters (e.g., $K_{WS1}$, $K_{WS2}$ and $K_L$). Compared to a FEM of the actuation structural environment (full or partial aircraft), structural model 30 is a massively reduced-order model, especially given that the behavior (force fight and first-rotation mode) for all configurations of system 22 may be captured with a single set of parameter values for each position. In some embodiments, such parameter values may be expressed as a function of the actuation position ($X_H$ or $X_S$) taking into consideration lever arm H.

In addition to its relative simplicity, structural model 30 may allow parameter estimation to be conducted statically for the left hand side of massless connector 34, and also independently of the estimation of parameters on the right hand side of massless connector 34. For example, in case of the parameters on the right hand side of massless connector 34 not being available or known, force fight and/or load compliance analysis may still be conducted using the parameters on the left hand side of massless connector 34. Accordingly, structural model 30 may permit the decoupling of static characteristics (e.g., force fight and load compliance) from the dynamic characteristics.

In some embodiments, one or more additional parameters such as a scale factor applied to load mass $M_L$ could also be used, if necessary, to improve the accuracy of structural model 30. Similarly, additional parameters could be added to actuation model 30 such as a scaling factor applied to one or more actuation branches 32 to increase its/their stiffness to better represent the load compliance. For example, in some embodiments, the torsion stiffness of flight control surface 20 that may appear in force fight situations may be included in the stiffness $K_S$ of actuation branches 32 but may not be significant when an aerodynamic load is applied to flight control surface 20. Therefore, the static stiffness portion of structural model 30 could, in some situations, be slightly too soft for representing compliance under load and compensation may be achieved via a suitable scaling factor.

Figure 7:
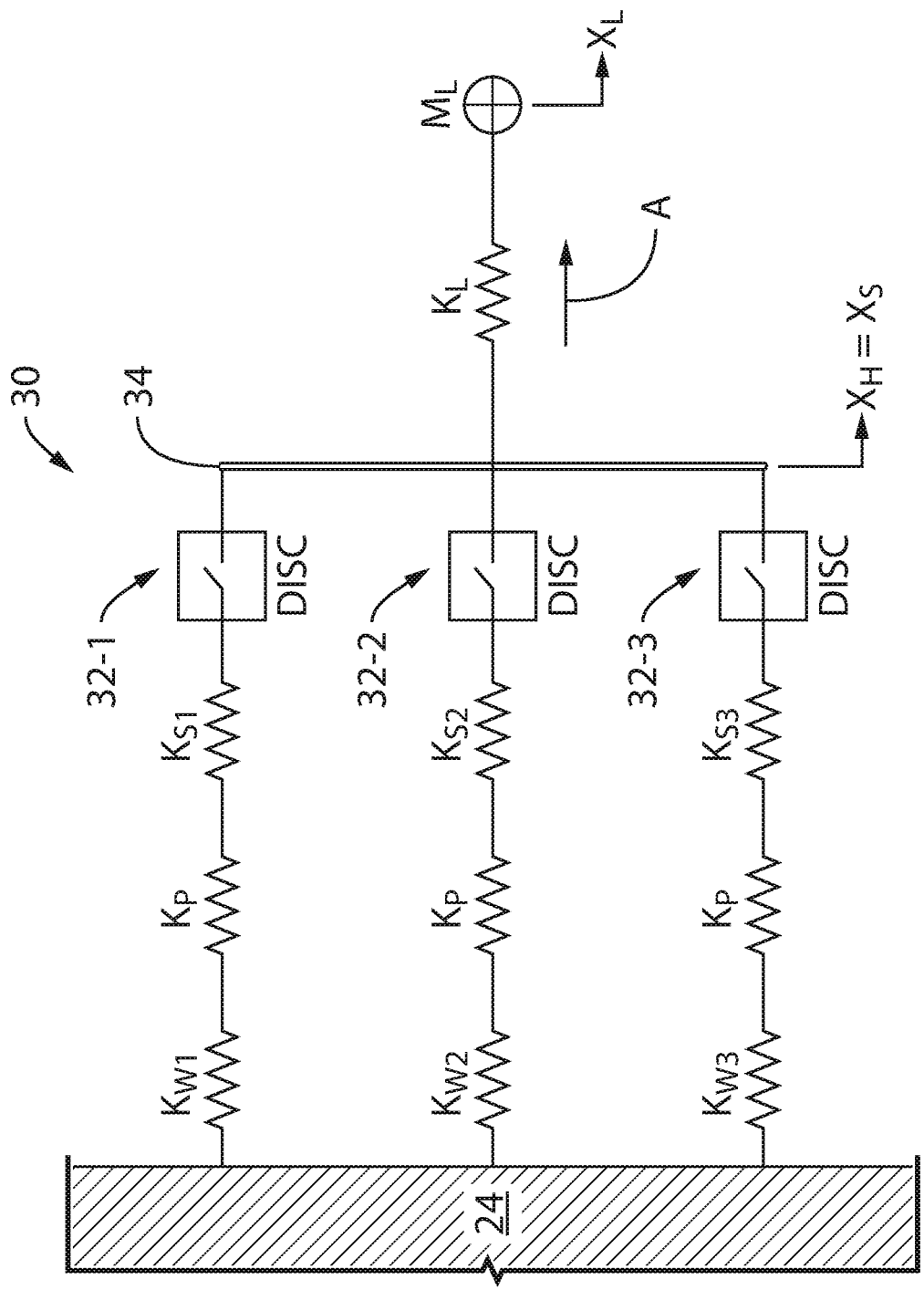
FIG. 7 is a graphical representation of another exemplary embodiment of the structural model for the system of FIG. 2 comprising three actuation branches.

FIG. 7 is a graphical representation of another exemplary embodiment of structural model 30 for system 22 of FIG. 2 comprising three actuation branches 32 where actuators 26 are represented simply as springs of stiffness $K_P$. The embodiment of FIG. 7 comprises elements previously described above and like elements are identified using like reference numerals. It is understood that actuator stiffness may not necessarily be identical in all actuation branches 32. The embodiment of FIG. 7 omits local actuation displacements of actuators 26 and considers only the stiffness terms. Structural model 30 may also include optional disconnect mechanisms DISC to optionally disconnect any actuation branch 32 from massless connector 34 to achieve different active A and disconnected X configurations of system 22. Different configurations of structural model 30 may be obtained by simply ignoring one or more selected actuation branches 32.

Figure 8:
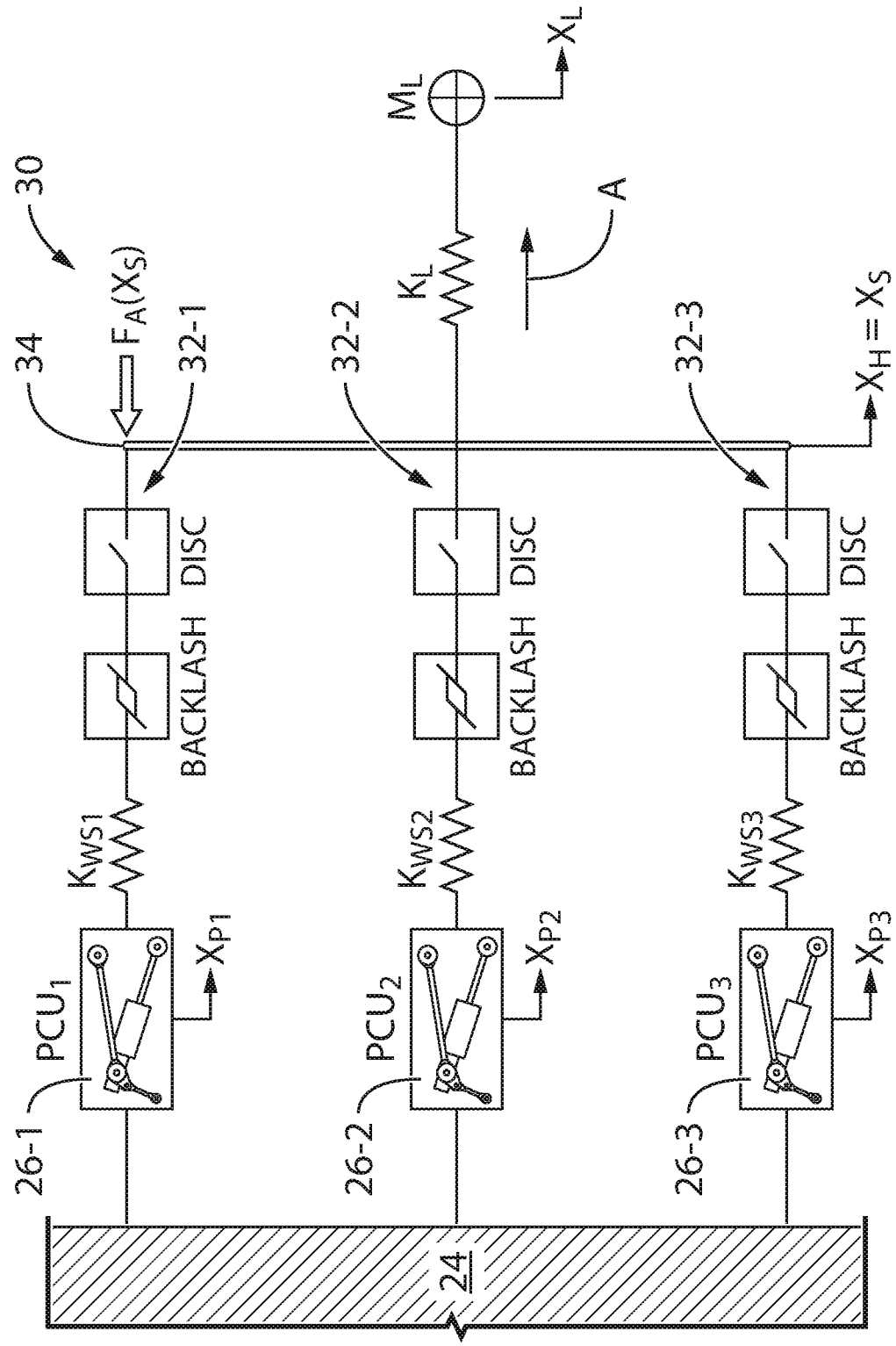
FIG. 8 is a graphical representation of another exemplary embodiment of the structural model for the system of FIG. 2 comprising three actuation branches.

FIG. 8 is a graphical representation of another exemplary embodiment of structural model 30 for system 22 of FIG. 2 comprising three actuation branches 32. The embodiment of FIG. 8 comprises elements previously described above and like elements are identified using like reference numerals. Structural model 30 of FIG. 8 shows backlash elements on each actuation branch 32. Such backlash elements could have associated logic to determine if non-linearity applies in a given situation. For example, such backlash could be disabled if a minimum level of residual force fight is present in system 22.

Structural model 30 of FIG. 8 shows each actuator 26 being represented as a detailed simulation model integrated into structural model 30 and implicitly including the stiffness $K_P$ (and optionally of other parameters) associated with each actuator 26.

Figure 9:
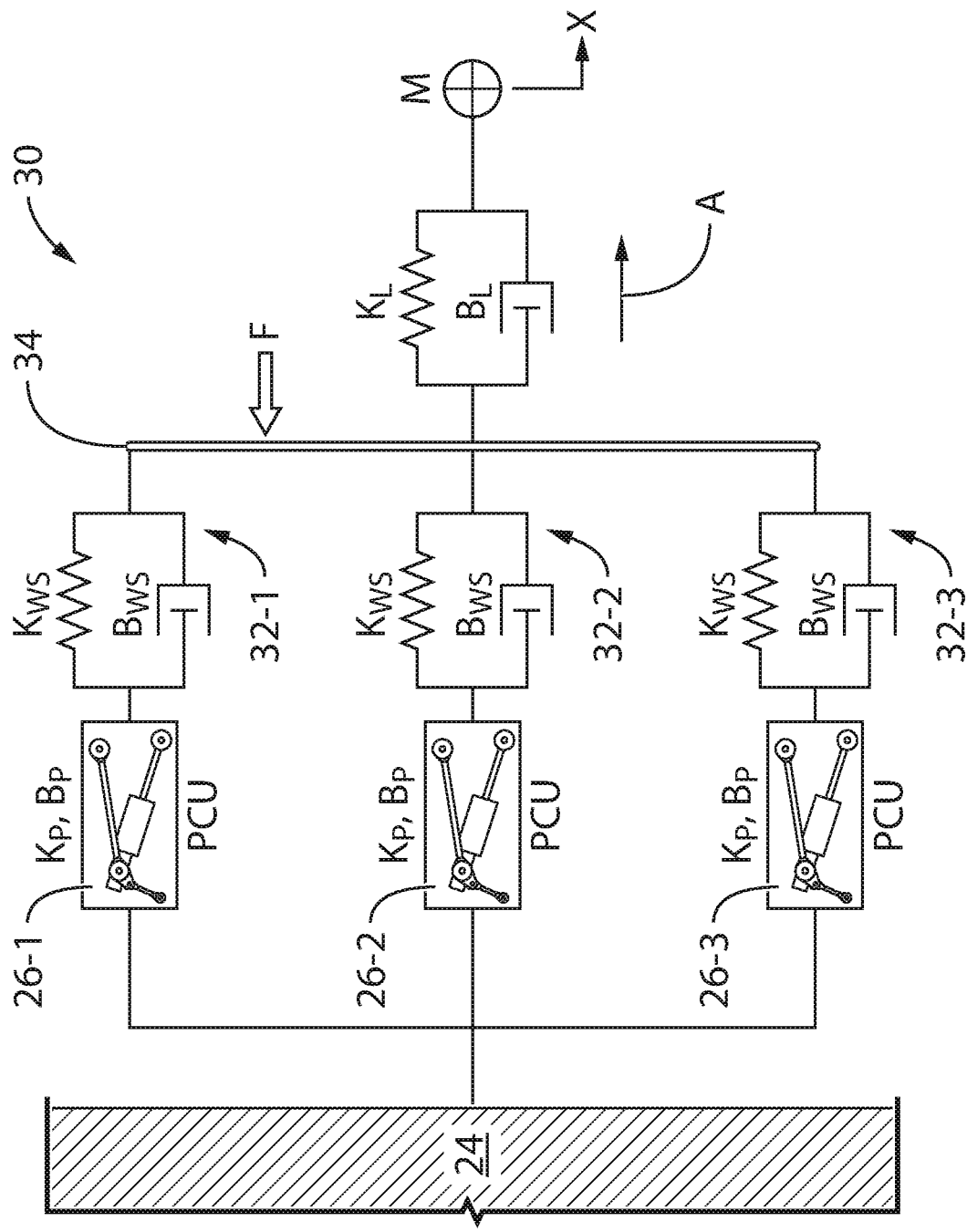
FIG. 9 is a graphical representation of another exemplary embodiment of the structural model for the system of FIG. 2 comprising three actuation branches.

FIG. 9 is a graphical representation of another exemplary embodiment of structural model 30 for system 22 of FIG. 2 comprising three actuation branches 32. The embodiment of FIG. 9 comprises elements previously described above and like elements are identified using like reference numerals. Structural model 30 may comprise damping terms to introduce friction or other damping in structural model 30. For example, structural model 30 may include branch damper $B_{WS}$ coupled in parallel with branch spring $K_{WS}$. Structural model 30 may further include load damper $B_L$ coupled in parallel with load spring $K_L$ so as to be disposed between massless connector 34 and load mass $M_L$. Structural model 30 of FIG. 9 shows each actuator 26 being represented as a detailed simulation model implicitly including the stiffness $K_P$ and damping characteristic $B_P$ of each actuator 26 into structural model 30.

In addition to active A and disconnected X configurations referenced above, one or more actuators 26 could optionally be put in a damping D mode. For example, a three-actuator system 22 could have the following six Active-Damped-Disconnect configurations: ADX, DAX, AXD, DXA, XAD and XDA.

Figure 10:
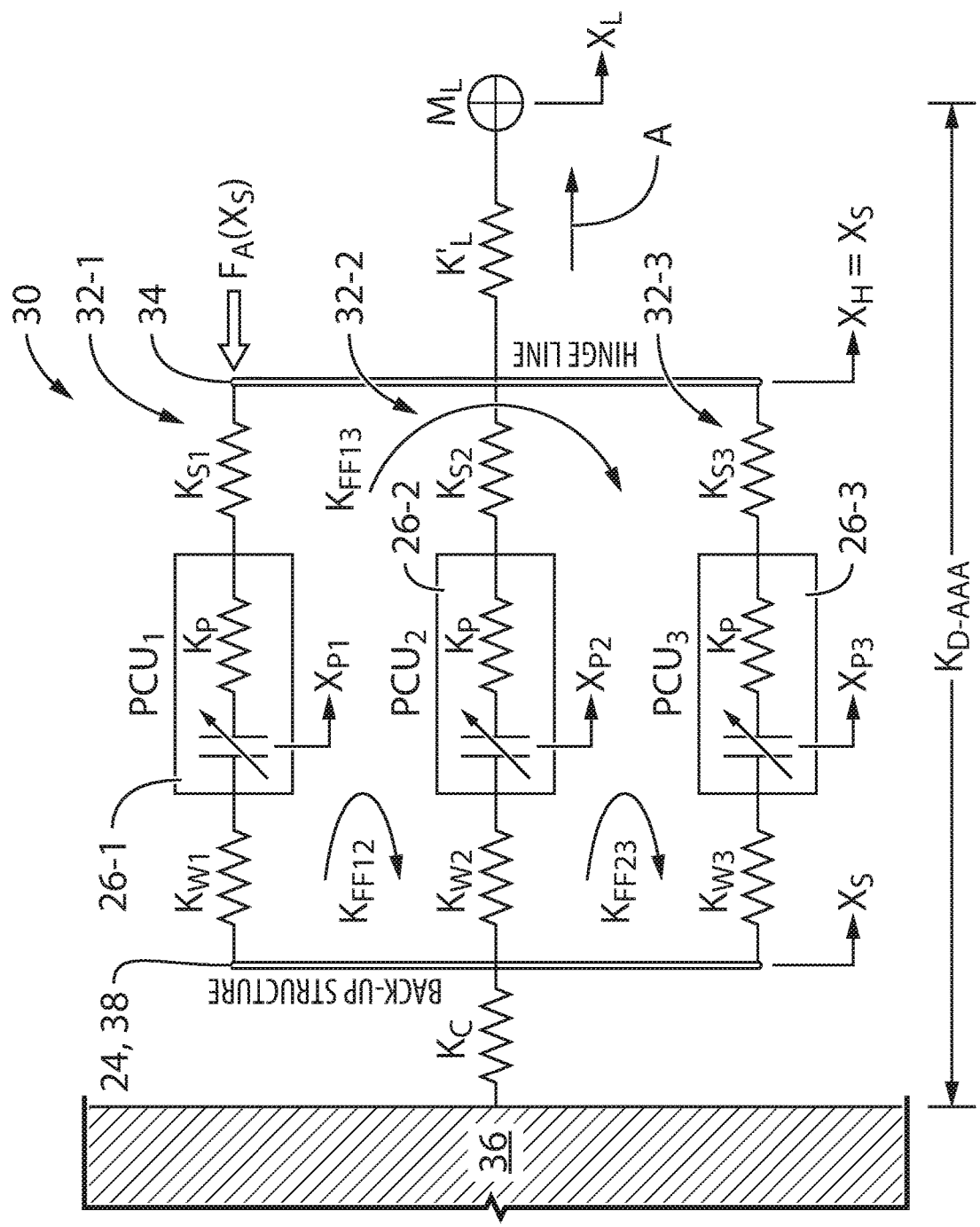
FIG. 10 is a graphical representation of another exemplary embodiment of the structural model for the system of FIG. 2 comprising three actuation branches.

FIG. 10 is a graphical representation of another exemplary embodiment of structural model 30 for system 22 of FIG. 2 comprising three actuation branches 32. The embodiment of FIG. 10 comprises elements previously described above and like elements are identified using like reference numerals. In case where structural model 30 requires increased accuracy to represent the compliance under load for system 22 including a given flight control surface 20 (i.e., extra deflection of flight control surface 20 due to air load $F_A$), then structural model 30 may be configured to include an additional stiffness term $K_C$ inserted between aircraft ground 36 and backup structure 24. In this situation, backup structure 24 may be represented by a second rigid and massless bar 38 permitted to move exclusively in a direction parallel to actuation direction A in the same manner as massless connector 34. The additional stiffness term $K_C$ may capture how the local backup structure 24 may give (i.e., move or deform) relative to the rest of aircraft 10 when flight control surface 20 is subjected to air load $F_A$.

Accordingly, structural model of FIG. 10 may comprise second rigid and massless bar 38 extending across the plurality of actuation branches 32. Second rigid and massless bar 38 may be being connected in series with the plurality of actuation branches 32. Second rigid and massless bar 38 may be disposed between the plurality of actuation branches 32 and aircraft ground 36. Second rigid and massless bar 38 may be resiliently connected to aircraft ground 36 via a spring of stiffness $K_C$.

In reference to FIG. 6, the value of $K_L$ may be chosen to capture the first rotation mode frequency of flight control surface 20. However, in order to keep the mode frequency the same, the addition of $K_C$ should combine with a modified value $K_L'$ so that their combination in series remains equal to $K_L$ so that $K_D$ is not affected. In other words, the following relationship may hold true for the embodiment of structural model 30 of FIG. 10:

$$\frac{1}{K_L} = \frac{1}{K_C} + \frac{1}{K_{L'}}.$$

Figure 11:
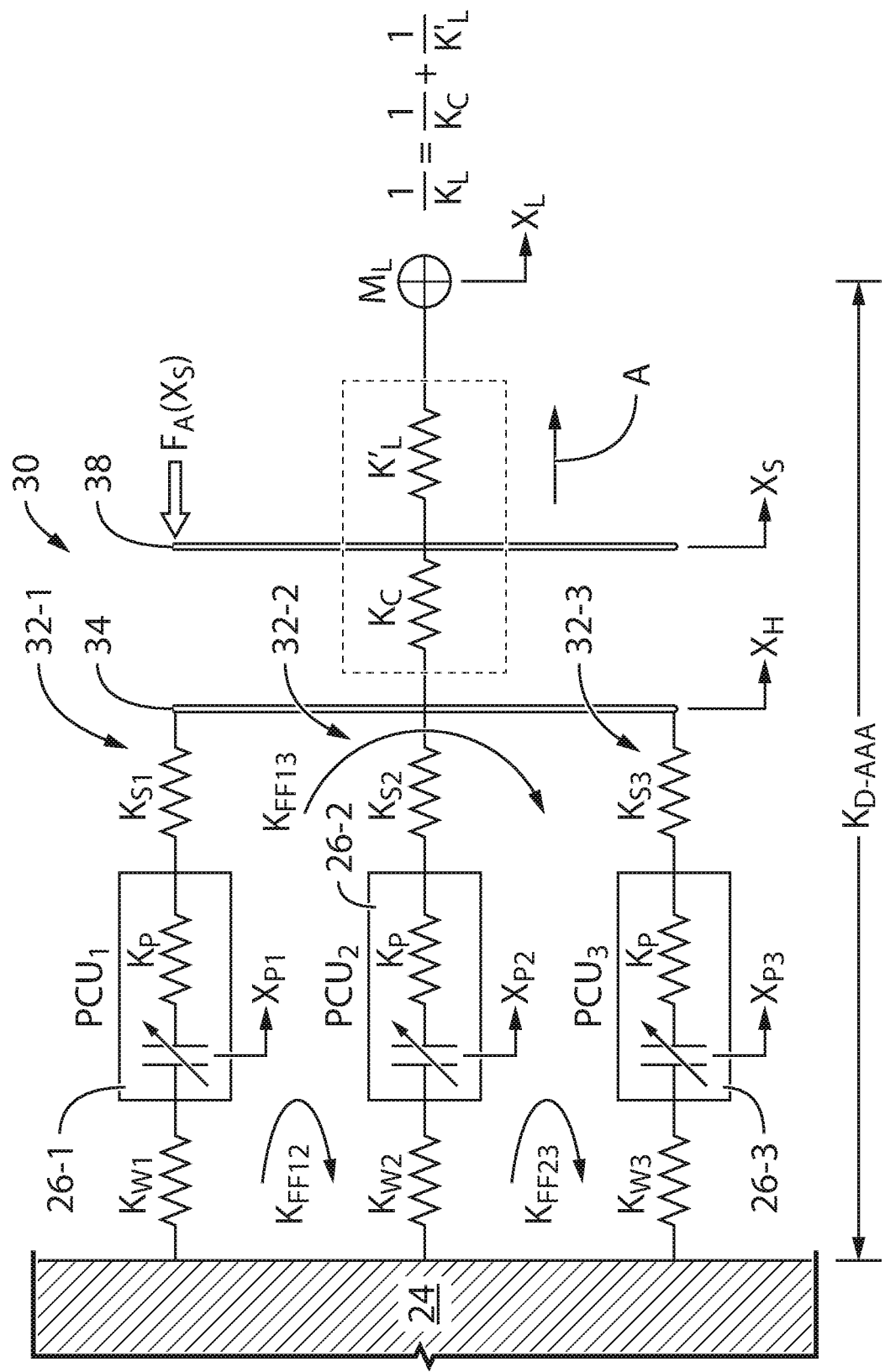
FIG. 11 is a graphical representation of another exemplary embodiment of the structural model for the system of FIG. 2 comprising three actuation branches.

FIG. 11 is a graphical representation of another exemplary embodiment of structural model 30 for system 22 of FIG. 2 comprising three actuation branches 32. The embodiment of FIG. 11 comprises elements previously described above and like elements are identified using like reference numerals. Similarly to the embodiment of FIG. 10, structural model 30 of FIG. 11 may also comprise the additional stiffness term $K_C$ but in order to preserve some of the topology of structural model 30 presented in preceding figures, the stiffness $K_C$ and second rigid and massless bar 38 may be moved to the right-hand-side of massless connector 34. For example, second rigid and massless bar 38 may be disposed between first rigid and massless bar 34 and load mass $M_L$. Second rigid and massless bar 38 may be resiliently connected to first rigid and massless bar 34 and to load mass $M_L$.

In some embodiments, the aerodynamic load $F_A(X_S)$ may then be applied to second rigid and massless bar 38 inserted between $K_C$ and $K_L'$. As in the embodiment of FIG. 10, second rigid and massless bar 38 may be permitted to move exclusively in a direction parallel to actuation branches 32. Aerodynamic load $F_A(X_S)$ may be applied to first rigid and massless bar 34 representing hinge line HL or to second rigid and massless bar 38. In other words, if the need arises, then $K_L$ may be split into two stiffness components in series, and aerodynamic load $F_A(X_S)$ may be applied at a connecting point between them (i.e., between $K_C$ and $K_L'$). This also implies that the position $X_S$ of flight control surface 20 may now be based on the position of second rigid and massless bar 38.

Figure 12:
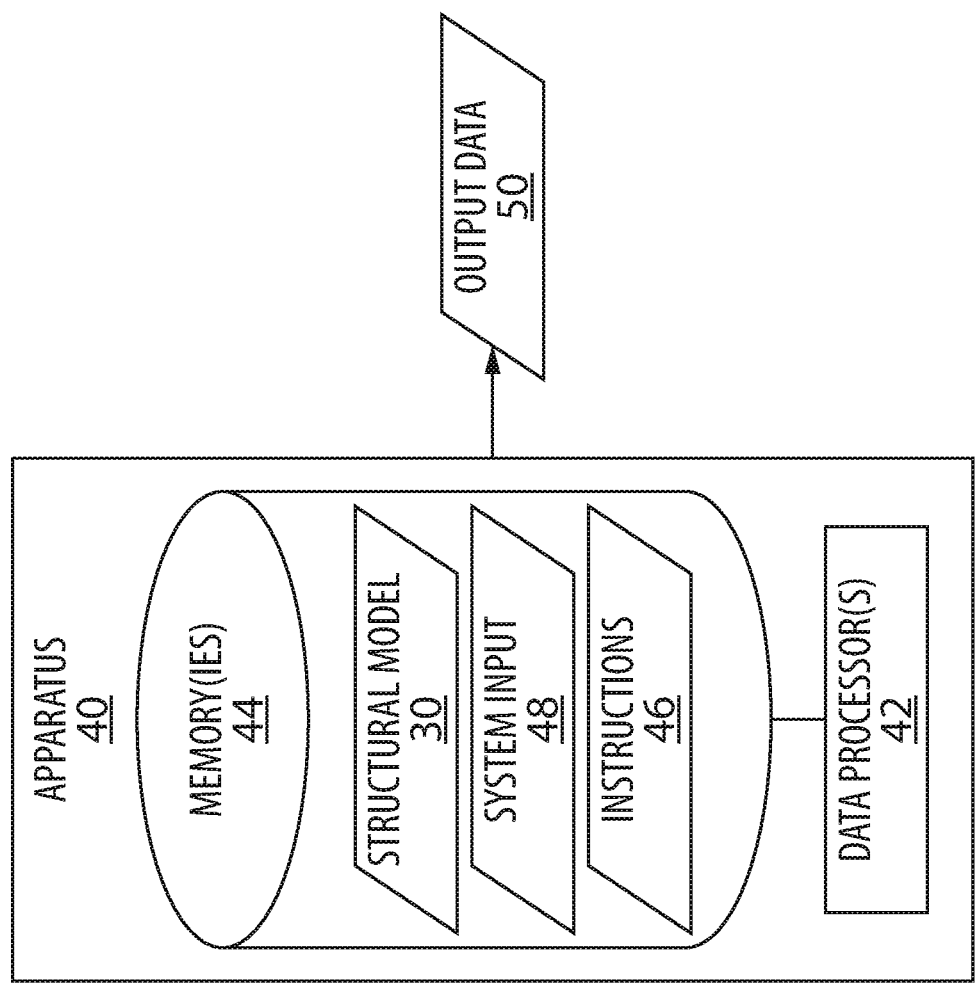
FIG. 12 is a schematic representation of an apparatus for modeling the system of FIG. 2.

FIG. 12 is a schematic representation of an apparatus 40 for modeling one or more aspects of system 22 of FIG. 2 based on structural model 30 described herein. Apparatus 40 may comprise one or more devices (e.g., computers) configured to conduct one or more steps associated with the methods disclosed herein. In various embodiments, apparatus 40 may comprise one or more data processors 42 (referred hereinafter in the singular as "processor 42") and non-transitory machine-readable memory(ies) 44 (referred hereinafter in the singular as "memory 44") operatively coupled to processor 42.

Processor 42 may comprise any suitable device(s) configured to cause a series of steps to be performed by apparatus 40 so as to implement a computer-implemented process such that instructions 46 stored in memory 44, when executed by apparatus 40, may cause the functions/acts specified in the methods described herein to be executed. Processor 42 may be part of a computer and may comprise, for example, any type of general-purpose microprocessor, other suitably programmed or programmable logic circuits, or any combination thereof.

Memory 44 may comprise any suitable machine-readable storage medium or media. Memory 44 may comprise non-transitory computer readable storage medium such as, for example, but not limited to, an electronic, magnetic, optical, electromagnetic, infrared, or semiconductor system, apparatus, or device, or any suitable combination of the foregoing. Memory 44 may include a suitable combination of any type of computer memory that is located either internally or externally to a computer of apparatus 40. Memory 44 may comprise any storage means (e.g. devices) suitable for retrievably storing machine-readable instructions 46 executable by processor 42.

Various aspects of the present disclosure may be embodied as apparatus, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium(ia) (e.g., memory 44) having computer readable program code (e.g., instructions 46) embodied thereon. The computer program product may, for example, be executed to cause the execution of one or more methods disclosed herein in entirety or in part. Computer program code for carrying out operations for aspects of the present disclosure in accordance with instructions 46 may be written in any combination of one or more programming languages. Such program code may be executed entirely or in part by apparatus 40 or other data processing device(s). It is understood that, based on the present disclosure, one skilled in the relevant arts could readily write computer program code for implementing the methods disclosed herein.

Memory 44 retrievably store machine-readable code representative of structural model 30, machine-readable code representative of system input 48 and machine-readable instructions 46 executable by processor 42. It is understood that machine-readable code representative of structural model 30, machine-readable code representative of system input 48 and machine-readable instructions 46 may be stored on the same or on different physical storage devices.

Memory 44 may comprise data representative of structural model 30 of system 22 including hinged flight control surface 20 and data representative of input 48 to system 22. The data representative of structural model 30 may comprise machine-readable code representative of one or more actuation branches 32 of system 22 where the one or more actuation branches 32 have a common linear actuation direction A and each actuation branch 32 comprises actuator 26. The data representative of structural model 30 may comprise machine-readable code representative of load mass $M_L$. The data representative of structural model 30 may comprise machine-readable code representative of massless connector 34 representative of hinge line HL of flight control surface 20 where massless connector 34 is connected to and disposed between the one or more actuation branches 34 and load mass $M_L$. The data representative of structural model 30 may be representative of massless connector 34 being movable along common linear actuation direction A so that linear movement of massless connector 34 may be correlated to rotational movement of hinged flight control surface 20. It is understood that data representative of structural model 30 may comprise machine-readable code representative of any combination of features of the different embodiments of structural model 30 disclosed herein.

Input 48 may comprise an aerodynamic load $F_A(Xs)$, a displacement or any other suitable condition or disturbance to system 22 that may be useful in the modeling of system 22 or part thereof.

Machine-readable instructions 46 may be executable by processor 42 and be configured to cause processor 42 to use the data representative of structural model 30 and data representative of input 48 and generate output data 50 representative of a response of system 22 as represented by structural model 30 to input 48. Output data 50 may be provided to a user of apparatus 40 via a suitable information output means such as a display device or printer for example.

Machine-readable instructions 46 may be configured to support modeling associated with analytical design and performance studies as well as substantially high-fidelity or real-time simplified simulation to support various tasks relating to static and/or dynamic performance analysis as listed above and useful in the design of system 22 and suitable controller(s). In some embodiments, machine-readable instructions 46 may be customized specifically for the particular application or may be part of an existing commercial software package configured to permit modeling of engineering systems. For example, machine-readable instructions 46 may be part of a software package sold under the trade name MATHWORKS. Examples of existing software packages suitable for generating or using structural model 30 for modeling purposes include SIMSCAPE MULTIBODY, MATLAB and SIMULINK sold under the trade name MATHWORKS.

Figure 13:
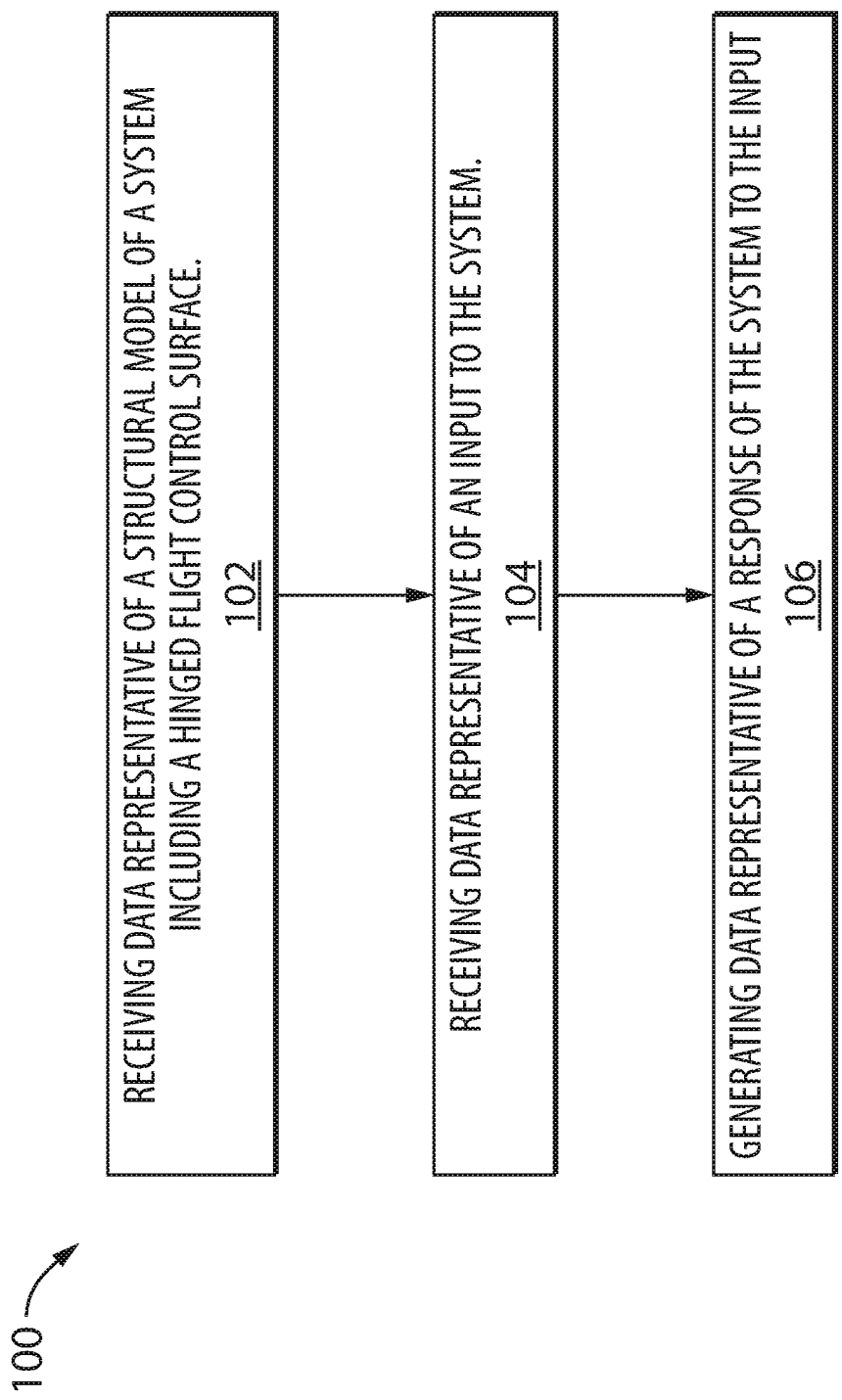
FIG. 13 is a flowchart illustrating a method for modeling the system of FIG. 2.

FIG. 13 is a flowchart illustrating a method 100 for modeling system 22 of FIG. 2 based on structural model 30. In various embodiments, method 100 may be computer-implemented. In some embodiments, method 100 or part(s) thereof may be performed using apparatus 40. Method 100 may comprise receiving data representative of structural model 30 of system 22 including hinged flight control surface 20 (see block 102). The data representative of structural model 30 may comprise machine-readable code representative of any combination of features of the different embodiments of structural model 30 disclosed herein. Method 100 may comprise receiving data representative of input 48 to system 22 (see block 104). Method 100 may comprise using the data representative of structural model 30 of system 22 and the data representative of input 48, and, generate output data 50 representative of the response of system 22 as represented by structural model 30 to input 48 (see block 106).

Input 48 may comprise an aerodynamic load $F_A(X_S)$, a displacement or any other suitable condition or disturbance to system 22 that may be useful in the modeling of system 22 or part thereof. For example, input 48 may comprise a function that varies with time. For example, input 48 may comprise a force representative of aerodynamic load $F_A(X_S)$ applied to massless connector 34 where the force is oriented parallel to the linear actuation direction A. For example, a magnitude of the force may be dependent upon a position of massless connector 34 along the linear actuation direction A. For example, input 48 may comprise an actuation distance (i.e., actuator stroke command or length) of one or more actuators 26.

Figure 14:
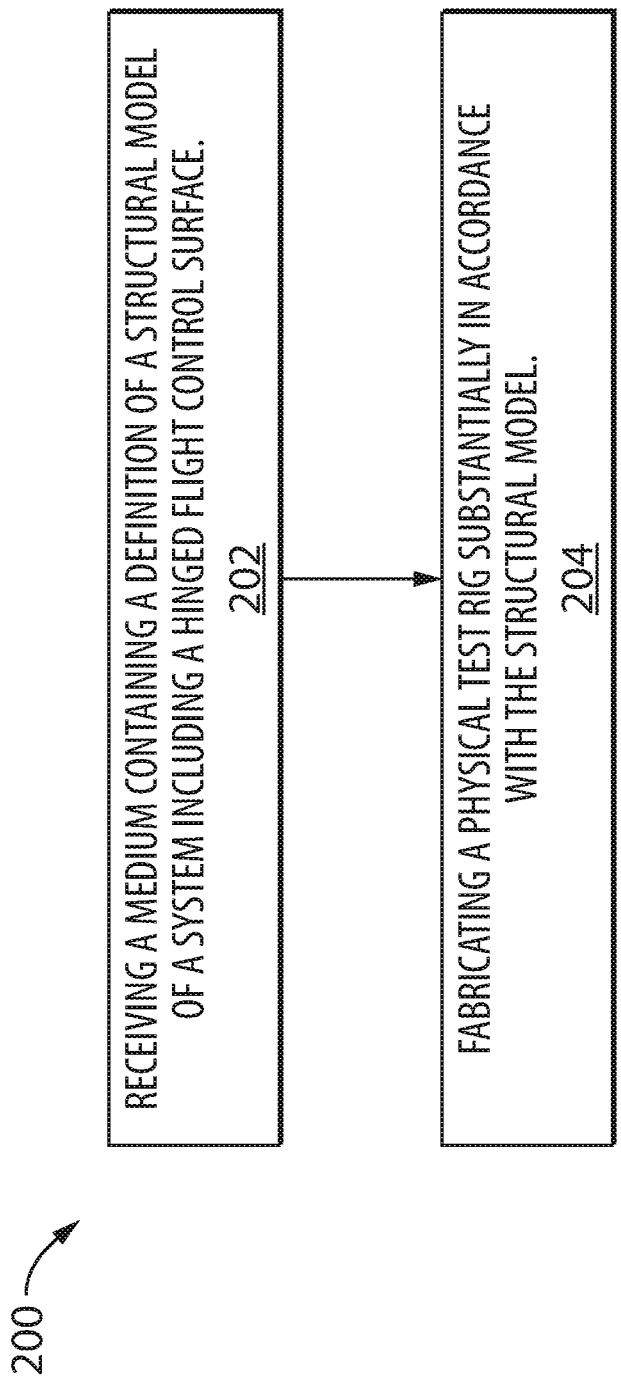
FIG. 14 is a flowchart illustrating a method for fabricating a physical rig for testing the system of FIG. 2.

FIG. 14 is a flowchart illustrating a method 200 for fabricating a physical rig (i.e., testing equipment/installation) for conducting physical testing of system 22 or components thereof. As explained above, structural model 30 may be relatively easily interpreted and may serve as a suitable specification for fabricating a test rig representative of system 22 for some form(s) of physical testing. Method 200 may comprise receiving a medium containing a definition of structural model 30 of system 22 (see block 202). The definition of structural model 30 may comprise any combination of features of the different embodiments of structural model 30 disclosed herein. The medium may comprise a machine-readable medium comprising machine-readable code representative of structural model 30. In other words, the medium may contain a digital representation of structural model 30. Alternatively, the medium may comprise a physical document containing a definition of structural model 30 as disclosed herein.

Method 200 may comprise fabricating the physical rig substantially in accordance with structural model 30 as defined by the medium. The physical rig may be fabricated according to suitable methods to approximate the representation defined by structural model 30. For example, stiffness values in structural model 30 may be represented by suitable springs on the physical test rig, damping values may be represented by suitable dashpots on the physical test rig and rigid and massless bars 34, 38 may be approximated by relatively rigid and light physical components (e.g., bars, beams, structures) on the physical test rig.

It is understood that a physical component approximating one of rigid and massless bars 34, 38 would need to have some mass in the physical test rig. The mass of such physical component would preferably be relatively small relative to load mass $M_L$ to reduce its impact on the accuracy of the physical test rig. An acceptable amount of mass for the physical component could, for example, be determined based on an expected impact of such mass on the frequency of the mode of interest of structural model 30 and system 22. In some embodiments, the mass of the physical component may, for example, be less than 10% of load mass $M_L$. In some embodiments, the mass of the physical component may be less than 5% of load mass $M_L$. In some embodiments, one or more other parameters of the physical test rig may be modified slightly from those specified in structural model 30 to compensate for the mass of the physical component in the physical test rig. For example, in some embodiments the value of load mass $M_L$ and/or the value of load spring $K_L$ of the physical test rig may be adjusted to compensate for a mode frequency change caused by the mass of such physical component(s).

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An apparatus for modeling a system including a hinged flight control surface of an aircraft, the apparatus comprising:
    one or more processors; and
    non-transitory machine-readable memory operatively coupled to the one or more processors, the machine-readable memory comprising:
        data representative of a structural model of the system including the hinged flight control surface, the structural model comprising:
            one or more actuation branches having a common linear actuation direction, each actuation branch comprising an actuator;
            a load mass; and
            a massless connector representing a hinge line of the flight control surface, the massless connector being connected to and disposed between the one or more actuation branches and the load mass, the massless connector being movable along the common linear actuation direction so that linear movement of the massless connector is correlated to rotational movement of the hinged flight control surface,
            wherein the structural model is configured to be used to fabricate a physical rig using a physical component approximating the massless connector, wherein the physical component has a mass that is less than 10% of the load mass; and
        machine-readable instructions executable by the one or more processors and configured to cause the one or more processors to:
            using the data representative of the structural model of the system and data representative of an input to the system, generate data representative of a response of the system to the input.

2. The apparatus as defined in claim 1, wherein the input varies as a function of time.

3. The apparatus as defined in claim 1, wherein the input comprises a force representative of an aerodynamic load applied to the massless connector, the force being oriented parallel to the linear actuation direction.

4. The apparatus as defined in claim 3, wherein a magnitude of the force is dependent upon a position of the massless connector along the linear actuation direction.

5. The apparatus as defined in claim 1, wherein the input comprises an actuation distance of the actuator.

6. The apparatus as defined in claim 1, wherein the load mass is resiliently connected to the massless connector.

7. The apparatus as defined in claim 1, wherein the structural model comprises a load damper disposed between the massless connector and the load mass.

8. The apparatus as defined in claim 1, wherein the one or more actuation branches of the structural model each comprises a branch spring.

9. The apparatus as defined in claim 8, wherein the branch spring defines a backup structure stiffness and a flight control surface stiffness.

10. The apparatus as defined in claim 8, wherein the branch spring defines an actuator stiffness.

11. The apparatus as defined in claim 8, wherein the structural model comprises a branch damper coupled in parallel with the branch spring.

12. The apparatus as defined in claim 1, wherein:
    the one or more actuation branches comprise a plurality of actuation branches;
    the massless connector comprises a first rigid and massless bar extending across the plurality of actuation branches; and
    the plurality of actuation branches are connected to a same side of the first rigid and massless bar.

13. The apparatus as defined in claim 12, wherein the structural model comprises a second rigid and massless bar extending across the plurality of actuation branches, the second rigid and massless bar being connected in series with the plurality of actuation branches and being movable along the linear actuation direction.

14. The apparatus as defined in claim 13, wherein the second rigid and massless bar is disposed between the first rigid and massless bar and the load mass.

15. The apparatus as defined in claim 14, wherein the second rigid and massless bar is resiliently connected to the first rigid and massless bar and to the load mass.

16. The apparatus as defined in claim 13, wherein the second rigid and massless bar is disposed between the plurality of actuation branches and a grounding structure.

17. The apparatus as defined in claim 16, wherein the second rigid and massless bar is resiliently connected to the grounding structure.

18. The apparatus as defined in claim 1, wherein the one or more actuation branches of the structural model each comprises a backup structure stiffness, an actuator stiffness and a flight control surface stiffness.

19. A computer-implemented method for modeling a system including a hinged flight control surface of an aircraft, the method comprising:
    receiving data representative of a structural model of the system including the hinged flight control surface, the structural model comprising:
        one or more actuation branches having a common linear actuation direction, each actuation branch comprising an actuator;
        a load mass; and
        a massless connector representative of a hinge line of the flight control surface, the massless connector being connected to and disposed between the one or more actuation branches and the load mass, the massless connector being movable along the common linear actuation direction so that linear movement of the massless connector is correlated to rotational movement of the hinged flight control surface, wherein the structural model is configured to be used to fabricate a physical rig using a physical component approximating the massless connector, wherein the physical component has a mass that is less than 10% of the load mass;

receiving data representative of an input to the system; and using the data representative of the structural model of the system and the data representative of the input to the system, generating data representative of a response of the system to the input.

20. A method for fabricating a physical rig for testing a system including a hinged flight control surface of an aircraft, the method comprising:

receiving a medium containing a definition of a structural model of the system including the hinged flight control surface, the structural model comprising:
one or more actuation branches having a common linear actuation direction, each actuation branch comprising an actuator;
a load mass; and
a massless connector representative of a hinge line of the flight control surface, the massless connector being connected to and disposed between the one or more actuation branches and the load mass, the massless connector being movable along the common linear actuation direction so that linear movement of the massless connector is correlated to rotational movement of the hinged flight control surface; and fabricating the physical rig substantially in accordance with the structural model using a physical component approximating the massless connector, wherein the physical component has a mass that is less than 10% of the load mass.

21. The method as defined in claim 20, wherein the physical component has a mass that is less than 5% of the load mass.

22. The method as defined in claim 20, comprising compensating for the mass of the physical component by adjusting one or more parameters of the physical rig.

23. A machine-readable medium useful for modeling or testing a system including a hinged flight control surface of an aircraft, the machine-readable medium comprising:

machine-readable code representative of one or more actuation branches of the system, the one or more actuation branches having a common linear actuation direction and each actuation branch comprising an actuator;

machine-readable code representative of a load mass;

machine-readable code representative of a massless connector representative of a hinge line of the flight control surface, the massless connector being connected to and disposed between the one or more actuation branches and the load mass, the massless connector being movable along the common linear actuation direction so that linear movement of the massless connector is correlated to rotational movement of the hinged flight control surface; and machine-readable code representative of a structural model is figured to be used to fabricate a physical rig using a physical component approximating the massless connector, wherein the physical component has a mass that is less than 10% of the load mass.

* * * * *